(12) United States Patent
Komori et al.

(10) Patent No.: US 12,485,894 B2
(45) Date of Patent: Dec. 2, 2025

(54) TRAVEL CONTROL DEVICE, TRAVEL CONTROL METHOD, AND NON-TRANSITORY RECORDING MEDIUM

(71) Applicant: TOYOTA JIDOSHA KABUSHIKI KAISHA, Toyota (JP)

(72) Inventors: Terumoto Komori, Sunto-gun (JP); Satoru Akahane, Tokyo-to (JP); Shimpei Kokubo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 18/485,584

(22) Filed: Oct. 12, 2023

(65) Prior Publication Data

US 2024/0262353 A1    Aug. 8, 2024

(30) Foreign Application Priority Data

Feb. 8, 2023   (JP) ................. 2023-017573

(51) Int. Cl.
*B60W 30/14* (2006.01)
*B60W 30/16* (2020.01)
*B60W 30/18* (2012.01)
*B60W 40/105* (2012.01)
*B60W 40/107* (2012.01)

(52) U.S. Cl.
CPC .......... *B60W 30/143* (2013.01); *B60W 30/16* (2013.01); *B60W 30/18163* (2013.01); *B60W 40/105* (2013.01); *B60W 40/107* (2013.01); *B60W 2520/105* (2013.01); *B60W 2554/4041* (2020.02); *B60W 2554/801* (2020.02)

(58) Field of Classification Search
CPC ............................................. B60W 30/18163
See application file for complete search history.

(56) References Cited

U.S. PATENT DOCUMENTS

| | | | |
|---|---|---|---|
| 2012/0218124 A1* | 8/2012 | Lee | B60W 30/18163 340/904 |
| 2019/0118811 A1* | 4/2019 | Watanabe | B60K 31/0008 |
| 2020/0180641 A1 | 6/2020 | Hashimoto et al. | |
| 2022/0242403 A1* | 8/2022 | Horita | B60W 30/08 |

FOREIGN PATENT DOCUMENTS

| | | |
|---|---|---|
| JP | 2003-237407 A | 8/2003 |
| JP | 2018-092205 A | 6/2018 |
| JP | 2019-073241 A | 5/2019 |
| JP | 2019-152955 A | 9/2019 |
| JP | 2020-093578 A | 6/2020 |

* cited by examiner

*Primary Examiner* — Imran K Mustafa
(74) *Attorney, Agent, or Firm* — Oliff PLC (57) ABSTRACT

A travel control device includes acquisition part acquiring surrounding vehicle information and surrounding road environment information of a host vehicle and control part performing blind area avoidance control based on the surrounding vehicle information, the surrounding vehicle information includes a detection result of an adjacent vehicle traveling on a lane adjacent to a lane on which the host vehicle is traveling by a side sensor provided in the host vehicle, and the control part performs at least one of determining whether the host vehicle is overtaking the adjacent vehicle and suppressing the blind area avoidance control while the host vehicle is overtaking the adjacent vehicle, and determining whether the adjacent vehicle is overtaking the host vehicle and suppressing the blind area avoidance control while the adjacent vehicle is overtaking the host vehicle.

10 Claims, 5 Drawing Sheets

TRAVEL CONTROL DEVICE, TRAVEL CONTROL METHOD, AND NON-TRANSITORY RECORDING MEDIUM

TECHNICAL FIELD

The present disclosure relates to a travel control device, a travel control method, and a non-transitory recording medium.

BACKGROUND

Patent Document 1 (Japanese Unexamined Patent Publication No. 2019-073241) describes blind area avoidance control for making a host vehicle avoid traveling in a blind area of an adjacent vehicle (surrounding vehicle) traveling on a lane adjacent to a lane on which the host vehicle is traveling. In the art described in Patent Document 1, control for making the host vehicle decelerate is performed as the blind area avoidance control. Further, Patent Document 2 (Japanese Unexamined Patent Publication No. 2020-093578) describes a side sensor detecting an external situation at a side of the host vehicle.

While a host vehicle is overtaking an adjacent vehicle, there is a time period in which the host vehicle is in a blind area of the adjacent vehicle. If the blind area avoidance control such as decelerating the host vehicle is performed in that time period, overtaking the adjacent vehicle by the host vehicle is interrupted and there is a possibility that the driver of the host vehicle feels uncomfortable. Further, while the adjacent vehicle is overtaking the host vehicle, there is a time period in which the host vehicle is in the blind area of the adjacent vehicle. If the blind area avoidance control such as decelerating the host vehicle is performed in that time period, the driver of the host vehicle cannot understand the reason for deceleration of the host vehicle and there is a possibility that the driver of the host vehicle feels uncomfortable.

A technique of using the side sensor provided in the host vehicle, determining whether the host vehicle is overtaking the adjacent vehicle, suppressing the blind area avoidance control while the host vehicle is overtaking the adjacent vehicle, and reducing discomfort of the driver of the host vehicle and a technique of using the side sensor provided in the host vehicle, determining whether the adjacent vehicle is overtaking the host vehicle, suppressing the blind area avoidance control while the adjacent vehicle is overtaking the host vehicle, and reducing discomfort of the driver of the host vehicle may be considered. However, the side sensor has characteristics that it is difficult for the side sensor to acquire relative velocity of the adjacent vehicle to the host vehicle while the host vehicle is overtaking the adjacent vehicle and while the adjacent vehicle is overtaking the host vehicle. For this reason, it is not possible to suitably suppress the blind area avoidance control by just using the side sensor.

SUMMARY

In view of the above-described points, it is an object of the present disclosure to provide a travel control device, a travel control method, and a non-transitory recording medium able to suitably suppress the blind area avoidance control for making the host vehicle avoid traveling in the blind area of the surrounding vehicle based on a detection result acquired by the side sensor.

(1) An aspect of the present disclosure is a travel control device having a processor configured to: acquire surrounding vehicle information and surrounding road environment information of a host vehicle; and perform blind area avoidance control for making the host vehicle avoid traveling in a blind area of a surrounding vehicle based on the surrounding vehicle information, the surrounding vehicle information including a detection result of an adjacent vehicle traveling on a lane adjacent to a lane on which the host vehicle is traveling acquired by a side sensor provided in the host vehicle, wherein the processor performs at least one of determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and determining whether the adjacent vehicle is overtaking the host vehicle based on the detection result of the adjacent vehicle acquired by the side sensor at the current time and the detection result of the adjacent vehicle acquired by the side sensor at a time before the current time and suppressing the blind area avoidance control while the adjacent vehicle is overtaking the host vehicle.

(2) In the travel control device according to above aspect (1), the processor may be configured to determine whether to suppress the blind area avoidance control, and calculate a degree of acceleration or deceleration of the host vehicle for suppressing the blind area avoidance control.

(3) In the travel control device according to above aspect (1) or (2), the processor may be configured to determine that the host vehicle is overtaking the adjacent vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is less than or equal to a first threshold value continues for greater than or equal to a first determination time period.

(4) In the travel control device according to any one of above aspects (1) to (3), the detection result of the adjacent vehicle acquired by the side sensor at the current time and the detection result of the adjacent vehicle acquired by the side sensor at the time before the current time may be detection results of the adjacent vehicle acquired by the side sensor at a timing when at least part of the adjacent vehicle is positioned in a first determination area that is set at least at a front side of the host vehicle.

(5) In the travel control device according to any one of above aspects (1) to (4), the processor may be configured to lift suppression of the blind area avoidance control when the adjacent vehicle is no longer in the first determination area after starting the suppression of the blind area avoidance control.

(6) In the travel control device according to any one of above aspects (1) to (5), the processor may be configured to lift the suppression of the blind area avoidance control when a second determination time period elapses after starting the suppression of the blind area avoidance control.

(7) In the travel control device according to any one of above aspects (1) to (6), the processor may be configured to determine that the adjacent vehicle is overtaking the host vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is greater than or equal to a second threshold value continues for greater than or equal to a third determination time period.

(8) In the travel control device according to any one of above aspects (1) to (7), the detection result of the adjacent vehicle acquired by the side sensor at the current time and the detection result of the adjacent vehicle acquired by the side sensor at the time before the current time may be detection results of the adjacent vehicle acquired by the side sensor at a timing when at least a part of the adjacent vehicle is positioned in a second determination area that is set at least at a rear side of the host vehicle.

(9) In the travel control device according to any one of above aspects (1) to (8), the processor may be configured to lift the suppression of the blind area avoidance control when the adjacent vehicle is no longer in the second determination area after starting the suppression of the blind area avoidance control.

(10) In the travel control device according to any one of above aspects (1) to (9), the processor may be configured to lift the suppression of the blind area avoidance control when a fourth determination time period elapses after starting the suppression of the blind area avoidance control.

(11) An aspect of the present disclosure is a travel control method including: acquiring surrounding vehicle information and surrounding road environment information of a host vehicle; and performing blind area avoidance control for making the host vehicle avoid traveling in a blind area of a surrounding vehicle based on the surrounding vehicle information, the surrounding vehicle information including a detection result of an adjacent vehicle traveling on a lane adjacent to a lane on which the host vehicle is traveling acquired by a side sensor provided in the host vehicle, wherein at least one of determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and determining whether the adjacent vehicle is overtaking the host vehicle based on the detection result of the adjacent vehicle acquired by the side sensor at the current time and the detection result of the adjacent vehicle acquired by the side sensor at a time before the current time and suppressing the blind area avoidance control while the adjacent vehicle is overtaking the host vehicle.

(12) An aspect of the present disclosure is a non-transitory recording medium having recorded thereon a computer program for causing a processor to execute a process including: acquiring surrounding vehicle information and surrounding road environment information of a host vehicle; and performing blind area avoidance control for making the host vehicle avoid traveling in a blind area of a surrounding vehicle based on the surrounding vehicle information, the surrounding vehicle information including a detection result of an adjacent vehicle traveling on a lane adjacent to a lane on which the host vehicle is traveling acquired by a side sensor provided in the host vehicle, wherein at least one of determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and determining whether the adjacent vehicle is overtaking the host vehicle based on the detection result of the adjacent vehicle acquired by the side sensor at the current time and the detection result of the adjacent vehicle acquired by the side sensor at a time before the current time and suppressing the blind area avoidance control while the adjacent vehicle is overtaking the host vehicle, is performed.

According to the present disclosure, it is possible to suitably suppress the blind area avoidance control for making the host vehicle avoid traveling in the blind area of the surrounding vehicle based on the detection result acquired by the side sensor.

DESCRIPTION OF EMBODIMENTS

Below, referring to the drawings, embodiments of a travel control device, a travel control method, and a non-transitory recording medium of the present disclosure will be explained.

First Embodiment

Figure 1:
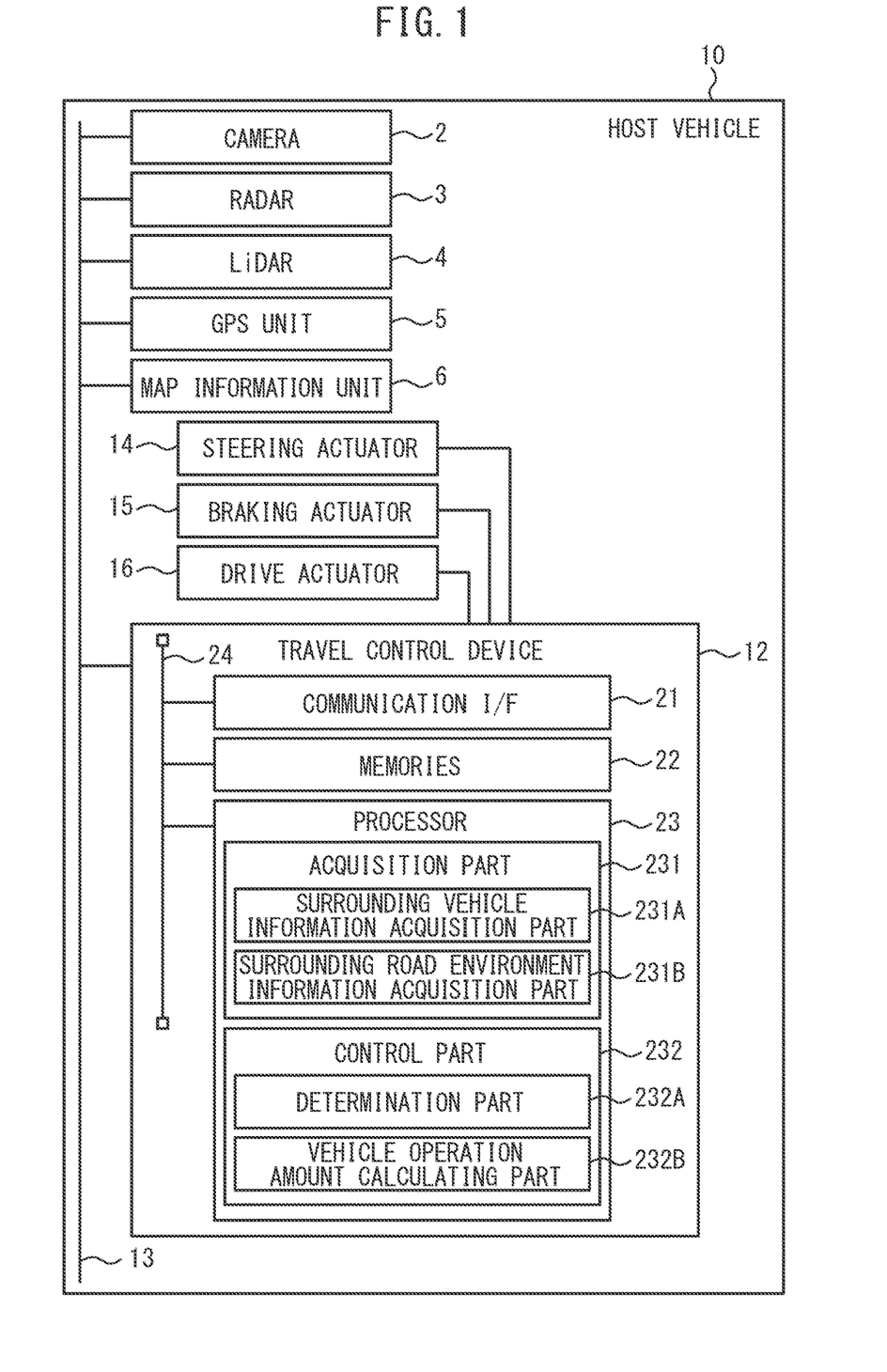
FIG. 1 is a view showing an example of a schematic configuration of a host vehicle 10 to which a travel control device 12 of a first embodiment is applied.

FIG. 1 is a view showing an example of a schematic configuration of a host vehicle 10 to which a travel control device 12 of a first embodiment is applied.

In the example shown in FIG. 1, the host vehicle 10 is provided with a camera 2, radar 3, LiDAR (light detection and ranging) 4, and travel control device 12. The camera 2 captures images of a surrounding vehicle (other vehicle present around the host vehicle 10) of the host vehicle 10 and the road environment (for example, the road structure, rules, etc.) around the host vehicle 10 and generates image data showing the surrounding vehicle and surrounding road environment and sends it to the travel control device 12. The radar 3 is, for example, a millimeter wave radar, 24 GHz band narrow band region radar, etc., detects a relative position and a relative speed of the surrounding vehicle and surrounding road structure with respect to the host vehicle 10, and sends a detection result to the travel control device 12. The LiDAR 4 detects the relative position and the relative speed of the surrounding vehicle and the surrounding road structure with respect to the host vehicle 10 and sends a detection result to the travel control device 12. At least one of the camera 2, the radar 3, and the LiDAR 4 functions as a side sensor for detecting the outside situation at a side of the host vehicle 10.

In another example, the host vehicle 10 may be provided with a sonar (not shown). In this example, the sonar detects a distance between the host vehicle 10 and the surrounding vehicle and the surrounding road structure and sends the detection result to the travel control device 12. In this example, the sonar may function as the side sensor.

In the example shown in FIG. 1, the host vehicle 10 is provided with a GPS (global positioning system) unit 5 and a map information unit 6. The GPS unit 5 acquires a positional information showing a current position of the host vehicle 10 based on the GPS signal and sends the positional information of the host vehicle 10 to the travel control device 12. The map information unit 6 is, for example, formed in a storage such as an HDD (hard disk drive), SSD (solid state drive), and the like mounted in the host vehicle 10. The map information held by the map information unit 6 includes various information such as the road structure (position of the road, shape of the road, lane structure, etc.), rules, and the like. The camera 2, the radar 3, the LiDAR 4, the GPS unit 5, the map information unit 6, and the travel control device 12 are connected through an internal vehicle network 13.

Further, the host vehicle 10 is provided with a steering actuator 14, a braking actuator 15, and a drive actuator 16. The steering actuator 14 has the function of steering the host vehicle 10. The steering actuator 14 includes, for example, a power steering system, a steer-by-wire steering system, a rear wheel steering system or the like. The braking actuator 15 has the function of making the host vehicle 10 decelerate. The braking actuator 15 includes, for example, a hydraulic brake, an electric power regeneration brake or the like. The drive actuator 16 has the function of making the host vehicle 10 accelerate. The drive actuator 16 includes, for example, an engine, an EV (electric vehicle) system, a hybrid system, a fuel cell system or the like.

In the example shown in FIG. 1, the travel control device 12 is composed of an automated driving control ECU (electronic control unit). The travel control device 12 (automated driving control ECU) can control the host vehicle 10 by a driving control level of level 3 according to the definition of the SAE (Society of Automotive Engineers), that is, a driving control level at which an operation of the steering actuator 14, the braking actuator 15, and the drive actuator 16 by the driver and a monitoring of surroundings of the host vehicle 10 by the driver are not necessary. Furthermore, the travel control device 12 can control the host vehicle 10 by a driving control level at which the driver is involved in the driving of the host vehicle 10, for example, a driving control level of levels 0 to 2 according to the definition of the SAE.

The travel control device 12 is composed of a microcomputer with a communication interface (I/F) 21, memories 22, and a processor 23. The communication interface 21, the memories 22, and the processor 23 are connected via a signal line 24. The communication interface 21 has an interface circuit for connecting the travel control device 12 to the internal vehicle network 13. The memories 22, for example, correspond to a storage part and have a volatile semiconductor memory and nonvolatile semiconductor memory. The memories 22 store a program and various types of data used in the processing performed by the processor 23. Further, the memories 22 store the detection result of the surrounding vehicle by the side sensor (for example, an adjacent vehicle traveling on a lane adjacent to a lane on which the host vehicle 10 is traveling) The processor 23 has the function of performing the blind area avoidance control making the host vehicle 10 avoid traveling in the blind area of the surrounding vehicle (in more detail, the blind area of the driver of the surrounding vehicle).

In the example shown in FIG. 1, the travel control device 12 is provided with one processor 23, but in another example, the travel control device 12 may be provided with a plurality of processors. Further, in the example shown in FIG. 1, the travel control device 12 (automated driving control ECU) is composed of one ECU, but in another example, the travel control device 12 may be composed of a plurality of ECUs.

In the example shown in FIG. 1, the processor 23 is provided with an acquisition part 231 and control part 232. The acquisition part 231 is provided with a surrounding vehicle information acquisition part 231A and a surrounding road environment information acquisition part 231B.

The surrounding vehicle information acquisition part 231A acquires surrounding vehicle information which is information showing position, speed, etc. of the surrounding vehicle of the host vehicle 10. Specifically, the surrounding vehicle information acquisition part 231A has the function of recognizing the position (in more detail, the relative position of the surrounding vehicle with respect to the host vehicle 10), the speed (in more detail, the relative speed of the surrounding vehicle with respect to the host vehicle 10), etc. of the surrounding vehicle based on image data showing the surrounding vehicle and sent from the camera 2. Further, the surrounding vehicle information acquisition part 231A has the function of recognizing the position, the speed, etc. of the surrounding vehicle based on the detection result of the relative position and the relative speed of the surrounding vehicle with respect to the host vehicle 10 sent from the radar 3. Furthermore, the surrounding vehicle information acquisition part 231A has the function of recognizing the position, the speed, etc. of the surrounding vehicle based on the detection result of the relative position and the relative speed of the surrounding vehicle with respect to the host vehicle 10 sent from the LiDAR 4. As explained above, at least one of the camera 2, the radar 3, and the LiDAR 4 functions as the side sensor, so the surrounding vehicle information acquisition part 231A acquires the detection result of the adjacent vehicle acquired by the side sensor and sent from the side sensor, as the surrounding vehicle information. Further, the surrounding vehicle information acquisition part 231A has the function of recognizing the relative position of the adjacent vehicle with respect to the host vehicle 10 and the relative speed of the adjacent vehicle with respect to the host vehicle 10 based on the detection result of the adjacent vehicle acquired by the side sensor.

In another example, the surrounding vehicle information acquisition part 231A may have the function of recognizing the position, the speed, etc. of the surrounding vehicle based on the detection result of the distance between the host vehicle 10 and the surrounding vehicle sent from the sonar. In the example in which the sonar functions as the side sensor, the surrounding vehicle information acquisition part 231A may recognize the relative position of the adjacent vehicle with respect to the host vehicle 10, the relative speed of the adjacent vehicle with respect to the host vehicle 10, etc. based on the detection result of the adjacent vehicle acquired by the side sensor and sent from the side sensor.

In the example shown in FIG. 1, the surrounding road environment information acquisition part 231B acquires surrounding road environment information which is information showing the road structure, rules, etc. around the host vehicle 10. Specifically, the surrounding road environment information acquisition part 231B has the function of recognizing the road structure, rules, etc. around the host vehicle 10 based on the image data showing the road environment (road structure, rules, etc.) around the host vehicle 10 and sent from the camera 2. Further, the surrounding road environment information acquisition part 231B has the function of recognizing the road structure, rules, etc. around the host vehicle 10 based on the map information sent from the map information unit 6.

That is, the acquisition part 231 has the function of recognizing objects present around the host vehicle 10 (surrounding vehicles and surrounding road environment). The object recognition may be performed based on information of any of the camera 2, radar 3, LiDAR 4, GPS unit 5, and map information unit 6. The object recognition may also be performed by sensor fusion of a combination of several of these as well. In object recognition, the type of the object, for example, whether the object is a moving object or a stationary object, is determined. In case of the moving object, its position and speed are calculated. The position and the speed of the moving object are, for example, calculated in a reference coordinate system centered about the host vehicle 10, the horizontal axis of the reference coordinate system corresponds to the width direction of the host vehicle 10, and the vertical axis of the reference coordinate system corresponds to the travel direction of the host vehicle 10.

In the example shown in FIG. 1, the acquisition part 231 has a surrounding vehicle detection function of detecting the surrounding vehicle to be monitored from objects recognized by the object recognition function. While the surrounding vehicle (adjacent vehicle) is traveling on a lane adjacent to a lane on which the host vehicle 10 is traveling and when the host vehicle 10 is traveling in a blind area of the surrounding vehicle, the surrounding vehicle is detected as the surrounding vehicle to be monitored by the surrounding vehicle detection function. Specifically, when the host vehicle 10 continuously travels such as for a predetermined time period or more in the blind area of the surrounding vehicle which is travelling on the lane adjacent to the lane on which the host vehicle 10 is travelling, the surrounding vehicle is detected as the surrounding vehicle to be monitored by the surrounding vehicle detection function.

The control part 232 performs control of the steering actuator 14, the braking actuator 15, the drive actuator 16, etc. based on the information acquired by the acquisition part 231.

The control part 232 has a first function of performing blind area avoidance control making the host vehicle 10 avoid traveling in the blind area of the surrounding vehicle based on the surrounding vehicle information acquired by the surrounding vehicle information acquisition part 231A. The control part 232 can perform the blind area avoidance control making the host vehicle 10 avoid traveling in the blind area of the surrounding vehicle as the surrounding vehicle to be monitored when the surrounding vehicle to be monitored is detected by the surrounding vehicle detection function.

The control part 232 can perform, for example, control for making the host vehicle 10 decelerate by operating the braking actuator 15, control for making the host vehicle 10 accelerate by operating the drive actuator 16, or the like as the blind area avoidance control in order to make the host vehicle 10 avoid traveling in the blind area of the surrounding vehicle as the surrounding vehicle to be monitored.

Further, the control part 232 has a second function of determining whether the host vehicle 10 is overtaking the adjacent vehicle based on the detection result acquired by the side sensor (the surrounding vehicle information acquired by the surrounding vehicle information acquisition part 231A) and suppressing the blind area avoidance control while the host vehicle 10 is overtaking the adjacent vehicle. Furthermore, the control part 232 has a third function of determining whether the adjacent vehicle is overtaking the host vehicle 10 based on the detection result acquired by the side sensor and suppressing the blind area avoidance control while the adjacent vehicle is overtaking the host vehicle 10.

Specifically, the control part 232 can stop performance of the blind area avoidance control in order to suppress the blind area avoidance control, for example. When the blind area avoidance control is performed by making the host vehicle 10 decelerate, the control part 232 can decrease operation amount of the braking actuator 15 which makes the host vehicle 10 decelerate, in order to suppress the blind area avoidance control. When the blind area avoidance control is performed by making the host vehicle 10 accelerate, the control part 232 can decrease operation amount of the drive actuator 16 which make the host vehicle 10 accelerate, in order to suppress the blind area avoidance control.

By the way, as explained above, the side sensor has the characteristics that it is difficult for the side sensor to acquire the relative velocity of the adjacent vehicle to the host vehicle 10 while the host vehicle 10 is overtaking the adjacent vehicle and while the adjacent vehicle is overtaking the host vehicle 10. For this reason, it is not possible to suitably suppress the blind area avoidance control by just using the side sensor.

Figures 2A, 2C:
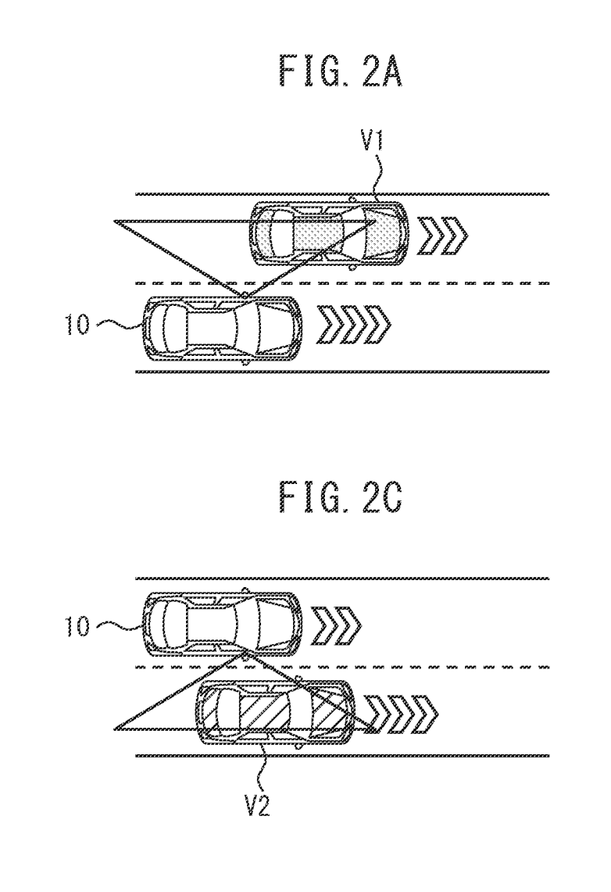
FIG. 2A shows an example of a host vehicle 10 while the host vehicle 10 is overtaking an adjacent vehicle V1.
FIG. 2C shows an example of an adjacent vehicle V2 while the adjacent vehicle V2 is overtaking the host vehicle 10.
Figures 2B, 2D:
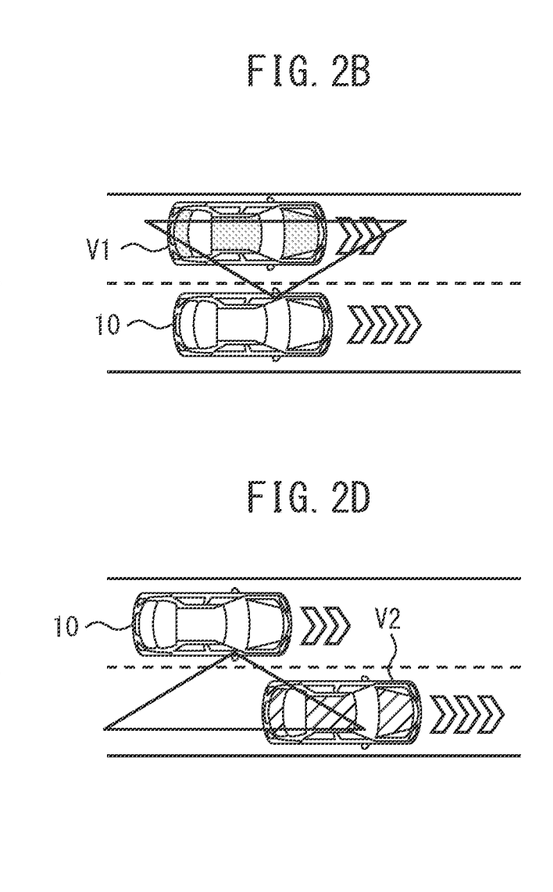
FIG. 2B shows the example of the host vehicle 10 while the host vehicle 10 is overtaking the adjacent vehicle V1.
FIG. 2D shows the example of the adjacent vehicle V2 while the adjacent vehicle V2 is overtaking the host vehicle 10.

FIGS. 2A to 2D are views for explaining the characteristics of the side sensor etc. In more detail, FIGS. 2A and 2B show an example of the host vehicle 10 while the host vehicle 10 is overtaking the adjacent vehicle V1, FIGS. 2C and 2D show an example of the adjacent vehicle V2 while the adjacent vehicle V2 is overtaking the host vehicle 10.

As shown in FIGS. 2A and 2B, with just use of the side sensor, the control part 232 is liable to be unable to accurately determine whether the host vehicle 10 is overtaking the adjacent vehicle V1 based on the detection result acquired by the side sensor. In more detail, if the control part 232 cannot determine that the host vehicle 10 is overtaking the adjacent vehicle V1 based on the detection result acquired by the side sensor at the time shown in FIG. 2A, the control part 232 determines that the host vehicle 10 is traveling in the blind area of the adjacent vehicle V1 based on the surrounding vehicle information of the host vehicle 10 at the time shown in FIG. 2B and performs the blind area avoidance control for making the host vehicle 10 avoid traveling in the blind area of the adjacent vehicle V1. In the example shown in FIGS. 2A and 2B in which control for making the host vehicle 10 decelerate is performed as the blind area avoidance control, the host vehicle 10 decelerates although the host vehicle 10 is overtaking the adjacent vehicle V1. For this reason, there is a possibility that the driver of the host vehicle 10 feels uncomfortable.

Further, as shown in FIGS. 2C and 2D, with just use of the side sensor, the control part 232 is liable to be unable to accurately determine whether the adjacent vehicle V2 is overtaking the host vehicle 10 based on the detection result acquired by the side sensor. In more detail, if the control part 232 cannot determine that the adjacent vehicle V2 is overtaking the host vehicle 10 based on the detection result acquired by the side sensor at the time shown in FIG. 2C, the control part 232 determines that the host vehicle 10 is traveling in the blind area of the adjacent vehicle V2 based on the surrounding vehicle information of the host vehicle 10 at the time shown in FIG. 2D and performs the blind area avoidance control for making the host vehicle 10 avoid traveling in the blind area of the adjacent vehicle V2. In the example shown in FIGS. 2C and 2D in which control for making the host vehicle 10 decelerate is performed as the blind area avoidance control, the host vehicle 10 decelerates while the adjacent vehicle V2 is overtaking the host vehicle 10. Accordingly, the driver of the host vehicle 10 cannot understand the reason for deceleration of the host vehicle 10 and there is a possibility that the driver of the host vehicle 10 feels uncomfortable.

In consideration of the above-mentioned point, in the example shown in FIG. 1, the control part 232 determines whether the host vehicle 10 is overtaking the adjacent vehicle V1 not only based on the detection result of the adjacent vehicle V1 acquired by the side sensor at the current time, but also based on the detection result (including such as the detection result of a rear end of the adjacent vehicle V1 acquired by the side sensor or the like) of the adjacent vehicle V1 acquired by the side sensor at the time before the current time and suppresses the blind area avoidance control while the host vehicle 10 is overtaking the adjacent vehicle V1.

In more detail, the control part 232 determines whether the host vehicle 10 is overtaking the adjacent vehicle V1 not only based on the detection result of the adjacent vehicle V1 acquired by the side sensor at the current time (for example, the detection result acquired by the side sensor at the time shown in FIG. 2A), but also based on the detection result of the adjacent vehicle V1 acquired by the side sensor at the time before the current time (for example, the detection result acquired by the side sensor at the time before the time shown in FIG. 2A). That is, the control part 232 determines whether the host vehicle 10 is overtaking the adjacent vehicle V1 based on, for example, the time change of the relative position of the rear end of the adjacent vehicle V1 with respect to the host vehicle 10 or the like. For this reason, the control part 232 can accurately determine that the host vehicle 10 is overtaking the adjacent vehicle V1.

In the example shown in FIGS. 1, 2A and 2B, when the control part 232 determines that the host vehicle 10 is overtaking the adjacent vehicle V1 and when the control part 232 determines that the host vehicle 10 is traveling in the blind area of the adjacent vehicle V1 based on the surrounding vehicle information of the host vehicle 10 at the time shown in FIG. 2B, the control part 232 does not perform the blind area avoidance control is not performed, but performs control for suppressing the blind area avoidance control. In the example shown in FIGS. 2A and 2B in which control for making the host vehicle 10 decelerate is performed as the blind area avoidance control, control such as stopping the performance of the blind area avoidance control, decreasing the operation amount of the braking actuator 15 which makes the host vehicle 10 decelerate or the like is performed in order to suppress the blind area avoidance control. For this reason, it is possible to reduce the possibility that the driver of the host vehicle 10 feels uncomfortable rather than a case in which only the detection result of the adjacent vehicle V1 acquired by the side sensor at the current time is used.

Furthermore, in the example shown in FIG. 1, the control part 232 determines whether the adjacent vehicle V2 is overtaking the host vehicle 10 not only based on the detection result of the adjacent vehicle V2 acquired by the side sensor at the current time, but also based on the detection result (including such as the detection result of a front end of the adjacent vehicle V2 acquired by the side sensor or the like) of the adjacent vehicle V2 acquired by the side sensor at the time before the current time and suppresses the blind area avoidance control while the adjacent vehicle V2 is overtaking the host vehicle 10.

In more detail, the control part 232 determines whether the adjacent vehicle V2 is overtaking the host vehicle 10 not only based on the detection result of the adjacent vehicle V2 acquired by the side sensor at the current time (for example, the detection result acquired by the side sensor at the time shown in FIG. 2C), but also based on the detection result of the adjacent vehicle V2 acquired by the side sensor at the time before the current time (for example, the detection result acquired by the side sensor at the time before the time shown in FIG. 2C). That is, the control part 232 determines whether the adjacent vehicle V2 is overtaking the host vehicle 10 based on, for example, the time change of the relative position of the front end of the adjacent vehicle V2 with respect to the host vehicle 10 or the like. For this reason, the control part 232 can accurately determine that the adjacent vehicle V2 is overtaking the host vehicle 10.

In the examples shown in FIGS. 1, 2C and 2D, when the control part 232 determines that the adjacent vehicle V2 is overtaking the host vehicle 10 and when the control part 232 determines that the host vehicle 10 is traveling in the blind area of the adjacent vehicle V2 based on the surrounding vehicle information of the host vehicle 10 at the time shown in FIG. 2D, the control part 232 does not perform the blind area avoidance control, but performs control for suppressing the blind area avoidance control. In the example shown in FIG. 2C and 2D in which control for making the host vehicle 10 decelerate is performed as the blind area avoidance control, control such as stopping the performance of the blind area avoidance control, decreasing the operation amount of the braking actuator 15 which makes the host vehicle 10 decelerate or the like is performed in order to suppress the blind area avoidance control. For this reason, it is possible to reduce the possibility that the driver of the host vehicle 10 feels uncomfortable rather than a case in which only the detection result of the adjacent vehicle V2 acquired by the side sensor at the current time is used.

In the example shown in FIG. 1, the control part 232 is provided with a determination part 232A and a vehicle operation amount calculating part 232B. The determination part 232A performs determination whether to suppress the blind area avoidance control for making the host vehicle 10 avoid traveling in the blind area of the surrounding vehicle (for example, the adjacent vehicles V1, V2, etc.) and the like.

The vehicle operation amount calculating part 232B has a function of calculating operation amounts of the steering actuator 14, the braking actuator 15, the drive actuator 16, etc. of the host vehicle 10. Specifically, the vehicle operation amount calculating part 232B has at least the function of calculating acceleration degree and deceleration degree of the host vehicle 10 for suppressing the blind area avoidance control. That is, when the determination part 232A determines to suppress the blind area avoidance control, the vehicle operation amount calculating part 232B calculates the acceleration degree or the deceleration degree of the host vehicle 10 for suppressing the blind area avoidance control.

Figure 3A:
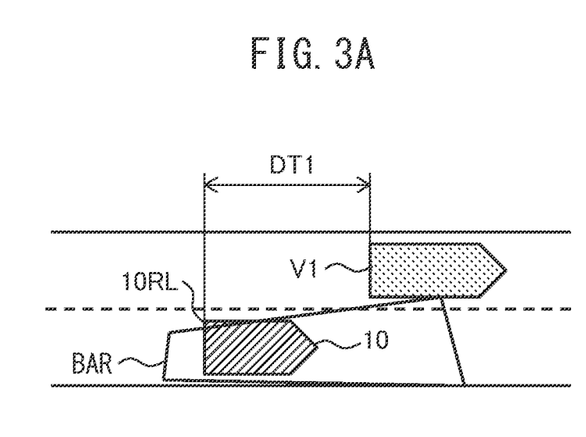
FIG. 3A shows an example in which it is determined that the host vehicle 10 is not traveling in a blind area BAR of the adjacent vehicle V1 (the host vehicle 10 is traveling outside of the blind area BAR of the adjacent vehicle V1) because a left rear end 10RL of the host vehicle 10 is positioned outside of the blind area BAR of the adjacent vehicle V1.
Figure 3B:
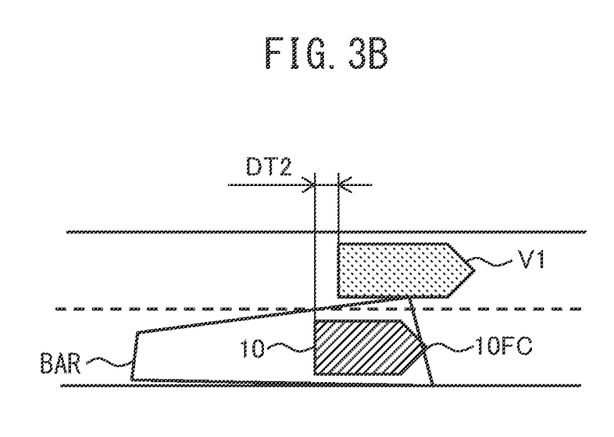
FIG. 3B shows an example in which it is determined that the host vehicle 10 is not traveling in the blind area BAR of the adjacent vehicle V1 because a front center 10FC of the host vehicle 10 is positioned outside of the blind area BAR of the adjacent vehicle V1.

FIGS. 3A and 3B are views for explaining set values used for determining whether the host vehicle 10 is traveling in the blind area BAR of the adjacent vehicle V1 etc. In more detail, FIG. 3A shows an example in which it is determined that the host vehicle 10 is not traveling in the blind area BAR of the adjacent vehicle V1 (the host vehicle 10 is traveling outside of the blind area BAR of the adjacent vehicle V1) because a left rear end 10RL of the host vehicle 10 is positioned outside of the blind area BAR of the adjacent vehicle V1. FIG. 3B shows an example in which it is determined that the host vehicle 10 is not traveling in the blind area BAR of the adjacent vehicle V1 because a front center 10FC of the host vehicle 10 is positioned outside of the blind area BAR of the adjacent vehicle V1.

In the example shown in FIGS. 3A and 3B (first example of the host vehicle 10 to which the travel control device 12 of the first embodiment is applied), length of the adjacent vehicle V1 is not measured or estimated, but length of an average vehicle is used as the length of the adjacent vehicle V1 in order to set the blind area BAR used for determining whether the host vehicle 10 is traveling in the blind area BAR of the adjacent vehicle V1. Furthermore, size and shape of the blind area occurring at the average vehicle which has an average vehicle length are used as size and shape of the blind area BAR occurring at the adjacent vehicle V1.

Further, it is set that the host vehicle 10 and the adjacent vehicle V1 have a relationship shown in FIG. 3A (that is, the left rear end 10RL of the host vehicle 10 is positioned outside the blind area BAR of the adjacent vehicle V1) when distance between the rear end of the host vehicle 10 and the rear end of the adjacent vehicle V1 is a predetermined distance DT1 (fixed value). Furthermore, it is set that the host vehicle 10 and the adjacent vehicle V1 have a relationship shown in FIG. 3B (that is, the front center 10FC of the host vehicle 10 is positioned outside the blind area BAR of the adjacent vehicle V1) when the distance between the rear end of the host vehicle 10 and the rear end of the adjacent vehicle V1 is a predetermined distance DT2 (fixed value). Namely, the size and the shape of the blind area BAR of the adjacent vehicle V1 are set so that it is determined that the host vehicle 10 is traveling in the blind area BAR of the adjacent vehicle V1 when the distance between the rear end of the host vehicle 10 and the rear end of the adjacent vehicle V1 is larger than the predetermined distance DT2 and smaller than the predetermined distance DT1.

In another example (second example of the host vehicle 10 to which the travel control device 12 of the first embodiment is applied), the length of the adjacent vehicle V1 may be estimated by using such as the image of the adjacent vehicle V1 captured by the camera 2, the detection result of the adjacent vehicle V1 by the LiDAR 4 or the like and the size and shape of the blind area BAR of the adjacent vehicle V1 may be set based on estimation result of the length of the adjacent vehicle V1.

Figure 4:
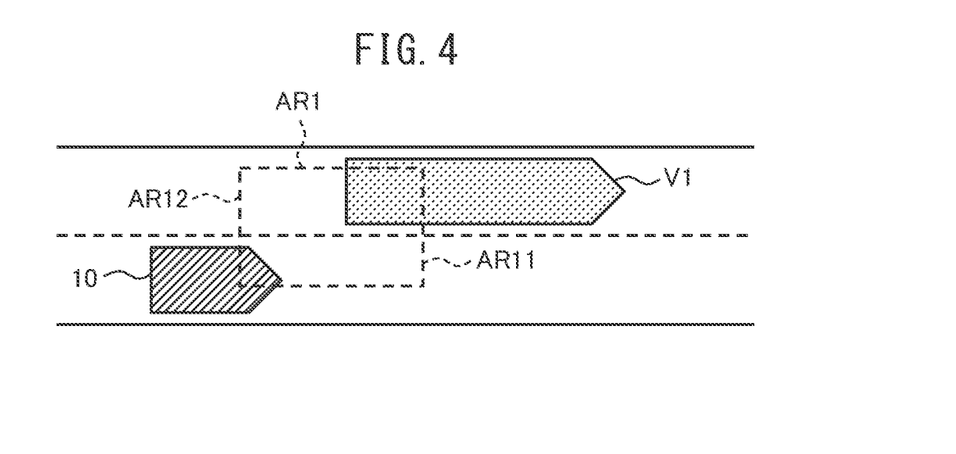
FIG. 4 is a view for explaining a first example in which a control part 232 determines that the host vehicle 10 is overtaking the adjacent vehicle V1 based on a detection result acquired by a side sensor.

FIG. 4 is a view for explaining a first example in which the control part 232 determines that the host vehicle 10 is overtaking the adjacent vehicle V1 based on the detection result acquired by the side sensor.

In the example shown in FIG. 4, the control part 232 determines that the host vehicle 10 is overtaking the adjacent vehicle V1 based on the detection result of the adjacent vehicle V1 acquired by the side sensor at the current time (for example, the time when the rear end of the adjacent vehicle V1 is positioned at the rear end AR12 of the determination area AR1 etc.) and the detection result of the adjacent vehicle V1 acquired by the side sensor at the time before the current time (for example, the time when the rear end of the adjacent vehicle V1 is positioned at the front end AR11 of the determination area AR1 etc.) when a state in which a value (negative value) after subtracting the speed of the host vehicle 10 from the speed of the adjacent vehicle V1 is less than or equal to a first threshold value (negative value) (that is, the state in which the host vehicle 10 is faster than the adjacent vehicle V1) continues for greater than or equal to a first determination time period.

In more detail, in the example shown in FIG. 4, the detection result of the adjacent vehicle V1 acquired by the side sensor at the current time is the detection result of the adjacent vehicle V1 acquired by the side sensor at a timing when a rear part and a center part of the adjacent vehicle V1 are positioned in the determination area AR1 set at the front side (right side of FIG. 4) of the host vehicle 10. Further, the detection result of the adjacent vehicle V1 acquired by the side sensor at the time before the current time is, for example, the detection result of the adjacent vehicle V1 acquired by the side sensor at a timing when only the rear end of the adjacent vehicle V1 is positioned in the determination area AR1.

As explained above, in the example shown in FIG. 4, the detection result at the time when the rear end of the adjacent vehicle V1 is positioned at the rear end AR12 of the determination area AR1 is used as the detection result of the adjacent vehicle V1 acquired by the side sensor at the current time, and the detection result at the time when the rear end of the adjacent vehicle V1 is positioned at the front end AR11 of the determination area AR1 is used as the detection result of the adjacent vehicle V1 acquired by the side sensor at the time before the current time.

In another example (first modification in which the control part 232 determines that the host vehicle 10 is overtaking the adjacent vehicle V1 based on the detection result acquired by the side sensor), the detection result at the time when the rear end of the adjacent vehicle V1 is positioned at the rear end AR12 of the determination area AR1 may be used as the detection result of the adjacent vehicle V1 acquired by the side sensor at the current time, and the detection result at the time when the rear end of the adjacent vehicle V1 is positioned at the front end AR11 of the determination area AR1 and the detection results of a plurality of times (time points) when the rear end of the adjacent vehicle V1 is positioned between the front end AR11 and rear end AR 12 of the determination area AR1 may be used as the detection result of the adjacent vehicle V1 acquired by the side sensor at the time before the current time. In this example, any of such as average value, maximum value, minimum value, central value or the like of the relative speed of the adjacent vehicle V1 at the time when the rear end of the adjacent vehicle V1 is positioned at the front end AR11 of the determination area AR1, the relative speed of the adjacent vehicle V1 at the time when the rear end of the adjacent vehicle V1 is positioned at the rear end AR12 of the determination area AR1, and the relative speeds of the adjacent vehicle V1 at the plurality of times (time points) when the rear end of the adjacent vehicle V1 is positioned between the front end AR11 and the rear end AR 12 of the determination area AR1 is used in order to calculate the relative speed of the adjacent vehicle V1 with respect to the host vehicle 10.

As explained above, in the example shown in FIG. 4, the control part 232 determines whether the host vehicle 10 is overtaking one adjacent vehicle V1 based on the detection result acquired by the side sensor.

In another example (second modification in which the control part 232 determines that the host vehicle 10 is overtaking adjacent vehicles based on the detection result acquired by the side sensor), the control part 232 may determine whether the host vehicle 10 is overtaking a plurality of adjacent vehicles (not shown) based on the detection results acquired by the side sensor. In this example, any of such as average value, maximum value, minimum value, central value, or the like of the relative speeds of the plurality of adjacent vehicles with respect to the host vehicle 10 is used in order to calculate the relative speed (typically one value) of the plurality of adjacent vehicles with respect to the host vehicle 10.

In a third modification in which the control part 232 determines that the host vehicle 10 is overtaking the adjacent vehicle based on the detection result acquired by the side sensor, the first modification in which the control part 232 determines the host vehicle 10 is overtaking the adjacent vehicle V1 based on the detection result acquired by the side sensor and the second modification in which the control part 232 determines the host vehicle 10 is overtaking the plurality of adjacent vehicles based on the detection result acquired by the side sensor may be suitably combined.

Figure 5:
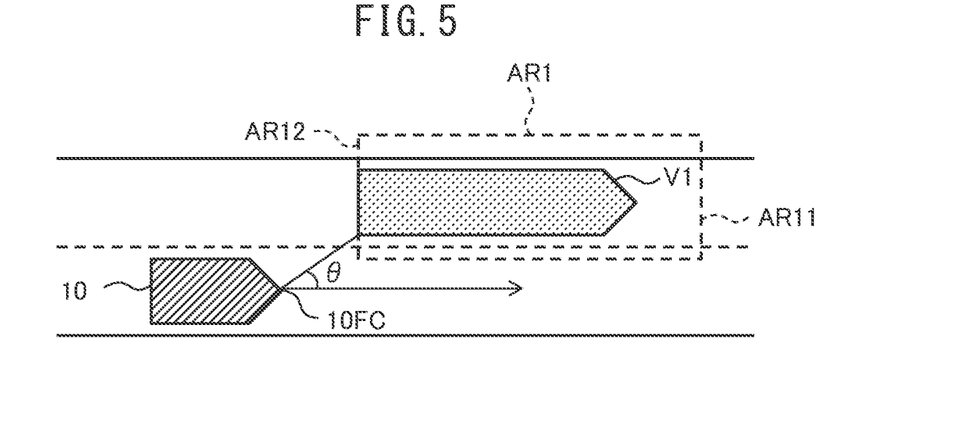
FIG. 5 is a view for explaining a second example in which the control part 232 determines that the host vehicle 10 is overtaking the adjacent vehicle V1 based on the detection result acquired by the side sensor.

FIG. 5 is a view for explaining a second example in which the control part 232 determines that the host vehicle 10 is overtaking the adjacent vehicle V1 based on the detection result acquired by the side sensor.

In the example shown in FIG. 5, the side sensor composed of at least one of the camera 2, the radar 3 and the LiDAR 4 is arranged at the front center 10FC of the host vehicle 10. The rear end AR12 of the determination area AR1 is set at a position where the detection precision of the side sensor used for detection of the relative speed of the adjacent vehicle V1 with respect to the host vehicle 10 becomes greater than or equal to a desired precision (position where the distance between the front center 10FC of the host vehicle 10 and the rear end AR12 of the determination area AR1 becomes, for example, 2 m). The front end AR11 of the determination area AR1 is set at a position where it is possible to get the detection result of the adjacent vehicle V1 acquired by the side sensor at the time before the current time, which is necessary for determining whether the host vehicle 10 is overtaking the adjacent vehicle V1 with a precision greater than or equal to a desired precision (that is, a position where it is possible to get a time change of the relative position of the rear end of the adjacent vehicle V1 with respect to the host vehicle 10).

If a sensor such as the radar 3, the LiDAR 4 or the like which can estimate the speed is used as the side sensor, the precision of speed with respect to the travel axis sometimes falls when the angle θ formed by the direction of the adjacent vehicle V1 as seen from the mounting position (that is, the front center 10FC of the host vehicle 10) of the side sensor and the travel direction of the host vehicle 10 becomes larger.

Considering this point, in the example shown in FIG. 5, the distance between the front center 10FC of the host vehicle 10 and the rear end AR12 of the determination area AR1 is set to, for example, 2 m (that is, for example, a value of 1 m to 5 m) as explained above, so that the angle θ becomes a relatively small value.

The front end AR11 of the determination area AR1 is set at a position where it is possible to get a time change of the relative position of the rear end of the adjacent vehicle V1 with respect to the host vehicle 10 such as for 0.5 second. If the relative speed A [m/s] of the host vehicle 10 with respect to the adjacent vehicle V1 is assumed, the distance between the front end AR11 and the rear end AR12 of the determination area AR1 is set to "A[m/s]×0.5[s]+margin [m]".

In the example shown in FIGS. 4 and 5, since the road on which the host vehicle 10 and the adjacent vehicle V1 travel is straight, the determination area AR1 is set to a rectangle, but in an example (not shown) in which the road on which the host vehicle 10 and the adjacent vehicle V1 travel is curved, the determination area AR1 may have a shape matching the curve of the road.

In the example shown in FIG. 1, the control part 232 performs control for suppressing the blind area avoidance control (control for avoiding the blind area of the adjacent vehicle V1) when the host vehicle 10 is traveling in the blind area of the adjacent vehicle V1 and when the host vehicle 10 is overtaking the adjacent vehicle V1. In more detail, the control part 232 starts suppression of the blind area avoidance control when the control part 232 determines that the host vehicle 10 is traveling in the blind area of the adjacent vehicle V1 and when the control part 232 determines that the host vehicle 10 is overtaking the adjacent vehicle V1.

In a first example in which the control part 232 lifts the suppression of the blind area avoidance control, the control part 232 lifts the suppression of the blind area avoidance control when the adjacent vehicle V1 is no longer in the determination area AR1 after starting the suppression of the blind area avoidance control (control for avoiding the blind area of the adjacent vehicle V1).

In a second example in which the control part 232 lifts the suppression of the blind area avoidance control, the control part 232 may lift the suppression of the blind area avoidance control when a second determination time period elapses after starting the suppression of the blind area avoidance control (control for avoiding the blind area of the adjacent vehicle V1).

In a third example in which the control part 232 lifts the suppression of the blind area avoidance control, the control part 232 may lift the suppression of the blind area avoidance control when the adjacent vehicle V1 is no longer in the determination area AR1 and when the second determination time period elapses after starting the suppression of the blind area avoidance control (control for avoiding the blind area of the adjacent vehicle V1).

As the second determination time period, for example, time period required for the host vehicle 10 to overtake the adjacent vehicle V1 (for example, a fixed value obtained by advance experiments, simulation, etc.) is used. In another example, the control part 232 may calculate the time period required for the host vehicle 10 to overtake the adjacent vehicle V1 based on the relative speed of the adjacent vehicle V1 with respect to the host vehicle 10 obtained from the detection result acquired by the side sensor and the length of the adjacent vehicle V1 and use that as the second determination time period.

Figure 6:
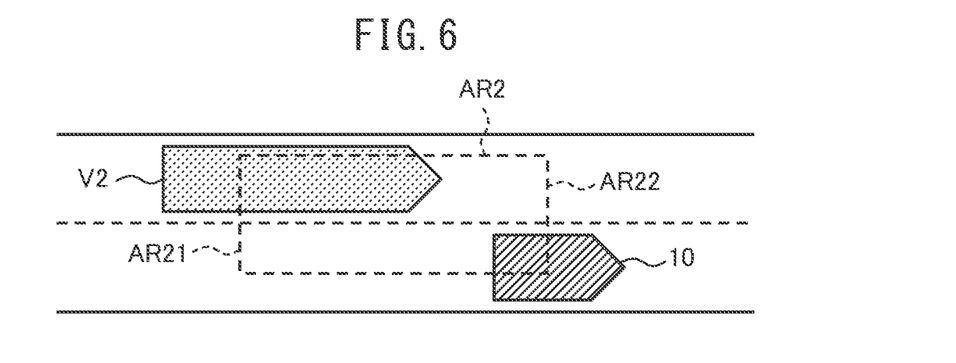
FIG. 6 is a view for explaining a first example in which the control part 232 determines that the adjacent vehicle V2 is overtaking the host vehicle 10 based on the detection result acquired by the side sensor.

FIG. 6 is a view for explaining a first example in which the control part 232 determines that the adjacent vehicle V2 is overtaking the host vehicle 10 based on the detection result acquired by the side sensor.

In the example shown in FIG. 6, the control part 232 determines that the adjacent vehicle V2 is overtaking the host vehicle 10 based on the detection result of the adjacent vehicle V2 acquired by the side sensor at the current time (for example, the time when the front end of the adjacent vehicle V2 is positioned at the front end AR22 of the determination area AR2 etc.) and the detection result of the adjacent vehicle V2 acquired by the side sensor at the time before the current time (for example, the time when the front end of the adjacent vehicle V2 is positioned at the rear end AR21 of the determination area AR2 etc.) when a state in which a value (positive value) after subtracting the speed of the host vehicle 10 from the speed of the adjacent vehicle V2 is greater than or equal to a second threshold value (positive value) (that is, the state in which the adjacent vehicle V2 is faster than the host vehicle 10) continues for greater than or equal-to a third determination time period.

In more detail, in the example shown in FIG. 6, the detection result of the adjacent vehicle V2 acquired by the side sensor at the current time is the detection result of the adjacent vehicle V2 acquired by the side sensor at a timing when a front part and a center part of the adjacent vehicle V2 are positioned in the determination area AR2 set at the rear side (left side of FIG. 6) of the host vehicle 10. Further, the detection result of the adjacent vehicle V2 acquired by the side sensor at the time before the current time is, for example, the detection result of the adjacent vehicle V2 acquired by the side sensor at a timing when only the front part of the adjacent vehicle V2 is positioned in the determination area AR2.

As explained above, in the example shown in FIG. 6, the detection result at the time when the front end of the adjacent vehicle V2 is positioned at the front end AR22 of the determination area AR2 is used as the detection result of the adjacent vehicle V2 acquired by the side sensor at the current time, and the detection result at the time when the front end of the adjacent vehicle V2 is positioned at the rear end AR21 of the determination area AR2 is used as the detection result of the adjacent vehicle V2 acquired by the side sensor at the time before the current time.

In another example (first modification in which the control part 232 determines that the adjacent vehicle V2 is overtaking the host vehicle 10 based on the detection result acquired by the side sensor), the detection result at the time when the front end of the adjacent vehicle V2 is positioned at the front end AR22 of the determination area AR2 may be used as the detection result of the adjacent vehicle V2 acquired by the side sensor at the current time, and the detection result at the time when the front end of the adjacent vehicle V2 is positioned at the rear end AR21 of the determination area AR2 and the detection results of a plurality of times (time points) when the front end of the adjacent vehicle V2 is positioned between the rear end AR21 and front end AR22 of the determination area AR2 may be used as the detection result of the adjacent vehicle V2 acquired by the side sensor at the time before the current time. In this example, any of such as average value, maximum value, minimum value, central value or the like of the relative speed of the adjacent vehicle V2 at the time when the front end of the adjacent vehicle V2 is positioned at the rear end AR21 of the determination area AR2, the relative speed of the adjacent vehicle V2 at the time when the front end of the adjacent vehicle V2 is positioned at the front end AR22 of the determination area AR2, and the relative speeds of the adjacent vehicle V2 at the plurality of times (time points) when the front end of the adjacent vehicle V2 is positioned between the rear end AR21 and front end AR22 of the determination area AR2 is used in order to calculate the relative speed of the adjacent vehicle V2 with respect to the host vehicle 10.

As explained above, in the example shown in FIG. 6, the control part 232 determines whether one adjacent vehicle V2 is overtaking the host vehicle 10 based on the detection result acquired by the side sensor.

In another example (second modification in which the control part 232 determines that the adjacent vehicle is overtaking the host vehicle 10 based on the detection result acquired by the side sensor), the control part 232 may determine whether a plurality of adjacent vehicles (not shown) is overtaking the host vehicle 10 based on the detection result acquired by the side sensor. In this example, any of such as average value, maximum value, minimum value, center value, or the like of the relative speeds of the plurality of adjacent vehicles with respect to the host vehicle 10 is used in order to calculate the relative speed (typically one value) of the plurality of adjacent vehicles with respect to the host vehicle 10.

In a third modification in which the control part 232 determines that the adjacent vehicle is overtaking the host vehicle 10 based on the detection result acquired by the side sensor, the first modification in which the control part 232 determines the adjacent vehicle V2 is overtaking the host vehicle 10 based on the detection result acquired by the side sensor and the second modification in which the control part 232 determines that the plurality of adjacent vehicles is overtaking the host vehicle 10 based on the detection result acquired by the side sensor may be suitably combined.

Figure 7:
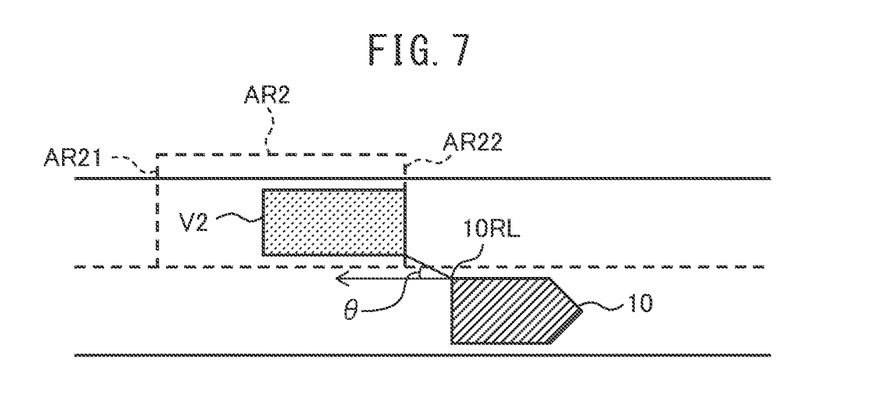
FIG. 7 is a view for explaining a second example in which the control part 232 determines that the adjacent vehicle V2 is overtaking the host vehicle 10 based on the detection result acquired by the side sensor.

FIG. 7 is a view for explaining a second example in which the control part 232 determines that the adjacent vehicle V2 is overtaking the host vehicle 10 based on the detection result acquired by the side sensor.

In the example shown in FIG. 7, the side sensor, composed of at least one of the camera 2, the radar 3, and the LiDAR 4, is arranged at the left rear end 10RL of the host vehicle 10. The front end AR22 of the determination area AR2 is set at a position where the detection precision of the side sensor used for detection of the relative speed of the adjacent vehicle V2 with respect to the host vehicle 10 becomes greater than or equal to a desired precision. The rear end AR21 of the determination area AR2 is set at a position where it is possible to get the detection result of the adjacent vehicle V2 acquired by the side sensor at the time before the current time, which is necessary for determining whether the adjacent vehicle V2 is overtaking the host vehicle 10 with a precision greater than or equal to a desired precision (that is, a position where it is possible to get a time change of the relative position of the front end of the adjacent vehicle V2 with respect to the host vehicle 10).

If a sensor such as the radar 3, the LiDAR 4 or the like which can estimate the speed is used as the side sensor, the precision of speed with respect to the travel axis sometimes falls when the angle θ (acute angle) formed by the direction of the adjacent vehicle V2 seen from the mounting position (that is, the left rear end 10RL of the host vehicle 10) of the side sensor and the travel direction of the host vehicle 10 becomes larger.

Considering this point, in the example shown in FIG. 7, the distance between the left rear end 10RL of the host vehicle 10 and the front end AR22 of the determination area AR2 is set to, for example, 1 m to 5 m, so that the angle θ becomes a relatively small value.

The rear end AR21 of the determination area AR2 is set at a position where it is possible to get a time change of the relative position of the front end of the adjacent vehicle V2 with respect to the host vehicle 10 such as for 0.5 second. If the relative speed B [m/s] of the host vehicle 10 with respect to the adjacent vehicle V2 is assumed, the distance between the rear end AR21 and the front end AR22 of the determination area AR2 is set to "B[m/s]×0.5[s]+margin [m]".

In the example shown in FIGS. 6 and 7, since the road on which the host vehicle 10 and the adjacent vehicle V2 travel is straight, the determination area AR2 is set to a rectangle, but in an example (not shown) in which the road on which the host vehicle 10 and the adjacent vehicle V2 travel is curved, the determination area AR2 may have a shape matching the curve of the road.

In the example shown in FIG. 1, the control part 232 performs control for suppressing the blind area avoidance control (control for avoiding the blind area of the adjacent vehicle V2) when the host vehicle 10 is traveling in the blind area of the adjacent vehicle V2 and when the adjacent vehicle V2 is overtaking the host vehicle 10. In more detail, the control part 232 starts suppression of the blind area avoidance control when the control part 232 determines that the host vehicle 10 is traveling in the blind area of the adjacent vehicle V2 and when the control part 232 determines that the adjacent vehicle V2 is overtaking the host vehicle 10.

In a fourth example in which the control part 232 lifts the suppression of the blind area avoidance control, the control part 232 lifts the suppression of the blind area avoidance control when the adjacent vehicle V2 is no longer in the determination area AR2 after starting the suppression of the blind area avoidance control (control for avoiding the blind area of the adjacent vehicle V2).

In a fifth example in which the control part 232 lifts the suppression of the blind area avoidance control, the control part 232 may lift the suppression of the blind area avoidance control when a fourth determination time period elapses after starting the suppression of the blind area avoidance control (control for avoiding the blind area of the adjacent vehicle V2).

In a sixth example in which the control part 232 lifts the suppression of the blind area avoidance control, the control part 232 may lift the suppression of the blind area avoidance control when the adjacent vehicle V2 is no longer in the determination area AR2 and when the fourth determination time period elapses after starting the suppression of the blind area avoidance control (control for avoiding the blind area of the adjacent vehicle V2).

As the fourth determination time period, for example, time period required for the adjacent vehicle V2 to overtake the host vehicle 10 (for example, a fixed value obtained by advance experiments, simulation, etc.) is used. In another example, the control part 232 may calculate the time period required for the adjacent vehicle V2 to overtake the host vehicle 10 based on the relative speed of the adjacent vehicle V2 with respect to the host vehicle 10 obtained from the detection result acquired by the side sensor and the length of the adjacent vehicle V2 and use that as the fourth determination time period.

In the examples shown in FIGS. 4 to 7, the determination area AR1 used when the host vehicle 10 performs overtaking and the determination area AR2 used when the host vehicle 10 is overtaken are separately set, but, in another example, a single common determination area (not shown) may be used when the host vehicle 10 performs the overtaking and when the host vehicle 10 is overtaken.

Figure 8:
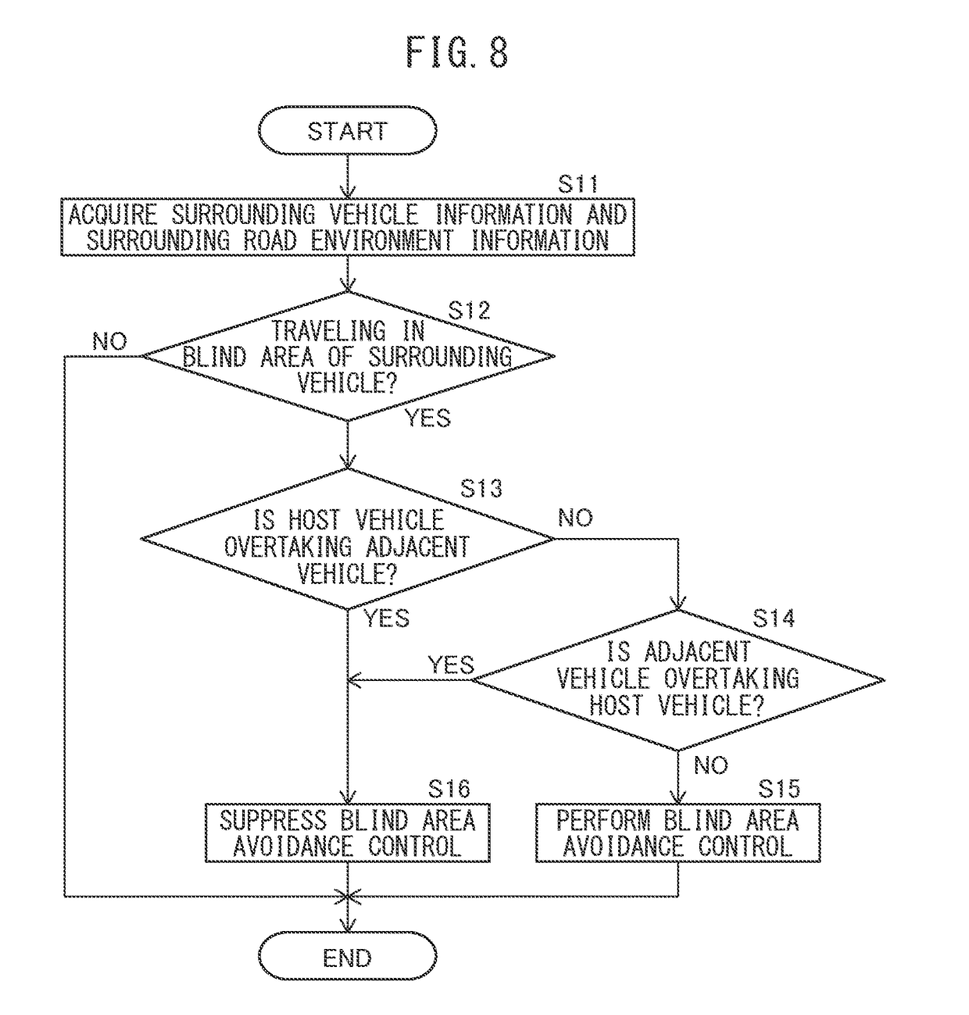
FIG. 8 is a flow chart for explaining an example of a blind area avoidance control and a control suppressing the blind area avoidance control performed by a processor 23.

FIG. 8 is a flow chart for explaining an example of the blind area avoidance control and the control for suppressing the blind area avoidance control performed by the processor 23.

In the example shown in FIG. 8, at step S11, the acquisition part 231 acquires the surrounding vehicle information and the surrounding road environment information of the host vehicle 10.

At step S12, the control part 232 determines whether the host vehicle 10 is traveling in the blind area of the surrounding vehicle based on the surrounding vehicle information of the host vehicle 10 acquired at step S11. In the case of YES, the routine proceeds to step S13, in the case of NO, the processing shown in FIG. 8 is ended.

At step S13, the control part 232 determines whether the host vehicle 10 is overtaking the adjacent vehicle V1 based on the surrounding vehicle information of the host vehicle 10 acquired at step S11. If NO, the routine proceeds to step S14, while if YES, the routine proceeds to step S16.

At step S14, the control part 232 determines whether the adjacent vehicle V2 is overtaking the host vehicle 10 based on the surrounding vehicle information of the host vehicle 10 acquired at step S11. If NO, the routine proceeds to step S15 while if YES, the routine proceeds to step S16. At step S15, the control part 232 performs the blind area avoidance control for making the host vehicle 10 avoid traveling in the blind area of the surrounding vehicle.

At step S16, the control part 232 suppresses the blind area avoidance control.

As explained above, in the host vehicle 10 to which the travel control device 12 of the first embodiment is applied, the blind area avoidance control for making the host vehicle 10 avoid traveling in the blind area of the surrounding vehicle can be performed when the host vehicle 10 is traveling in the blind area of the surrounding vehicle. Furthermore, the blind area avoidance control is suppressed when the host vehicle 10 which is overtaking the adjacent vehicle V1 is in the blind area of the adjacent vehicle V1. For this reason, in the host vehicle 10 to which the travel control device 12 of the first embodiment is applied, it is possible to reduce the possibility that the driver of the host vehicle 10 feels uncomfortable rather than a case in which the blind area avoidance control is not suppressed when the host vehicle 10 is overtaking the adjacent vehicle V1. Further, the blind area avoidance control is suppressed when the host vehicle 10 is in the blind area of the adjacent vehicle V2 which is overtaking the host vehicle 10. For this reason, in the host vehicle 10 to which the travel control device 12 of the first embodiment is applied, it is possible to reduce the possibility that the driver of the host vehicle 10 feels uncomfortable rather than a case in which the blind area avoidance control is not suppressed when the adjacent vehicle V2 is overtaking the host vehicle 10.

Second Embodiment

The host vehicle 10 to which the travel control device 12 of a second embodiment is applied is configured in the same way as the host vehicle 10 to which the travel control device 12 of the first embodiment explained above is applied except for the points explained later.

As explained above, in the host vehicle 10 to which the travel control device 12 of the first embodiment is applied, the control part 232 has a first function of performing the blind area avoidance control for making the host vehicle 10 avoid traveling in the blind area of the surrounding vehicle based on the surrounding vehicle information acquired by the surrounding vehicle information acquisition part 231A, a second function of determining whether the host vehicle 10 is overtaking the adjacent vehicle V1 based on the detection result acquired by the side sensor and suppressing the blind area avoidance control when the host vehicle 10 is overtaking the adjacent vehicle V1, and a third function of determining whether the adjacent vehicle V2 is overtaking the host vehicle 10 based on the detection result acquired by the side sensor and suppressing the blind area avoidance control when the adjacent vehicle V2 is overtaking the host vehicle 10.

On the other hand, in the host vehicle 10 to which the travel control device 12 of the second embodiment is applied, the control part 232 has the first function of performing the blind area avoidance control for making the host vehicle 10 avoid traveling in the blind area of the surrounding vehicle based on the surrounding vehicle information acquired by the surrounding vehicle information acquisition part 231A and the second function of determining whether the host vehicle 10 is overtaking the adjacent vehicle V1 based on the detection result acquired by the side sensor and suppressing the blind area avoidance control when the host vehicle 10 is overtaking the adjacent vehicle V1 and does not have the third function of determining whether the adjacent vehicle V2 is overtaking the host vehicle 10 based on the detection result acquired by the side sensor and suppressing the blind area avoidance control when the adjacent vehicle V2 is overtaking the host vehicle 10.

Third Embodiment

The host vehicle 10 to which the travel control device 12 of a third embodiment is applied is configured in the same way as the host vehicle 10 to which the travel control device 12 of the first embodiment explained above is applied except for the points explained later.

In the host vehicle 10 to which the travel control device 12 of the third embodiment is applied, the control part 232 has the first function of performing the blind area avoidance control for making the host vehicle 10 avoid traveling in the blind area of the surrounding vehicle based on the surrounding vehicle information acquired by the surrounding vehicle information acquisition part 231A and the third function of determining whether the adjacent vehicle V2 is overtaking the host vehicle 10 based on the detection result acquired by the side sensor and suppressing the blind area avoidance control when the adjacent vehicle V2 is overtaking the host vehicle 10 and does not have the second function of determining whether the host vehicle 10 is overtaking the adjacent vehicle V1 based on the detection result acquired by the side sensor and suppressing the blind area avoidance control when the host vehicle 10 is overtaking the adjacent vehicle V1.

The embodiments of the travel control device, the travel control method, and the non-transitory recording medium of the present disclosure were explained above with reference to the drawings, but the travel control device, the travel control method, and the non-transitory recording medium of the present disclosure are not limited to the above embodiments and can be suitably changed in a range not departing from the gist of the present disclosure. The constitutions of respective examples of the above embodiments may also be suitably combined.

In respective examples of the above embodiments, the processing performed at the travel control device 12 (automated driving control ECU) was explained as software processing performed by running a program stored in the memories 22, but the processing performed by the travel control device 12 may also be processing performed by hardware. Alternatively, the processing performed in the travel control device 12 may be processing combining both software and hardware. Further, the program stored in the memories 22 of the travel control device 12 (program for realizing the function of the processor 23 of the travel control device 12), for example, may be recorded in a computer readable recording medium such as a semiconductor memory, magnetic recording medium, optical recording medium (non-transitory recording medium), etc. and supplied, distributed, etc.

The invention claimed is:

1. A travel control device comprising a processor configured to:

acquire surrounding vehicle information and surrounding road environment information of a host vehicle; and
perform blind area avoidance control for making the host vehicle avoid traveling in a blind area of a surrounding vehicle based on the surrounding vehicle information,
the surrounding vehicle information including a detection result of an adjacent vehicle traveling on a lane adjacent to a lane on which the host vehicle is traveling acquired by a side sensor provided in the host vehicle,
wherein the processor performs
determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and
determining whether the adjacent vehicle is overtaking the host vehicle based on the detection result of the adjacent vehicle acquired by the side sensor at the current time and the detection result of the adjacent vehicle by the side sensor at a time before the current time and suppressing the blind area avoidance control while the adjacent vehicle is overtaking the host vehicle,
the processor is configured to determine that the host vehicle is overtaking the adjacent vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is less than or equal to a first threshold value continues for greater than or equal to a first determination time period, the detection result of the adjacent vehicle acquired by the side sensor at the current time and the detection result of the adjacent vehicle acquired by the side sensor at the time before the current time are detection results of the adjacent vehicle acquired by the side sensor at a timing when at least a part of the adjacent vehicle is positioned in a first determination area that is set at least at a front side of the host vehicle, the side sensor is arranged at the front center of the host vehicle, the distance between the front center of the host vehicle and a rear end of the first determination area is set to a value of 1 m to 5 m, a front end of the first determination area is set at a position where it is possible to get a time change of a relative position of a rear end of the adjacent vehicle with respect to the host vehicle for 0.5 second, the distance between the front end and the rear end of the first determination area is set to "A[m/s]×0.5[s]+margin[m]" where A [m/s] is a relative speed of the host vehicle with respect to the adjacent vehicle.

2. The travel control device according to claim 1, wherein the processor is configured to
  determine whether to suppress the blind area avoidance control, and
  calculate a degree of acceleration or deceleration of the host vehicle for suppressing the blind area avoidance control.

3. The travel control device according to claim 1, wherein the processor is configured to lift suppression of the blind area avoidance control when the adjacent vehicle is no longer in the first determination area after starting the suppression of the blind area avoidance control.

4. The travel control device according to claim 1, wherein the processor is configured to lift the suppression of the blind area avoidance control when a second determination time period elapses after starting the suppression of the blind area avoidance control.

5. The travel control device according to claim 1, wherein the processor is configured to determine that the adjacent vehicle is overtaking the host vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is greater than or equal to a second threshold value continues for greater than or equal to a third determination time period.

6. The travel control device according to claim 5, wherein the detection result of the adjacent vehicle acquired by the side sensor at the current time and the detection result of the adjacent vehicle acquired by the side sensor at the time before the current time are detection results of the adjacent vehicle acquired by the side sensor at a timing when at least a part of the adjacent vehicle is positioned in a second determination area that is set at least at a rear side of the host vehicle.

7. The travel control device according to claim 6, wherein the processor is configured to lift suppression of the blind area avoidance control when the adjacent vehicle is no longer in the second determination area after starting the suppression of the blind area avoidance control.

8. The travel control device according to claim 6, wherein the processor is configured to lift the suppression of the blind area avoidance control when a fourth determination time period elapses after starting the suppression of the blind area avoidance control.

9. A travel control method comprising:
acquiring surrounding vehicle information and surrounding road environment information of a host vehicle; and
performing blind area avoidance control for making the host vehicle avoid traveling in a blind area of a surrounding vehicle based on the surrounding vehicle information,
the surrounding vehicle information including a detection result of an adjacent vehicle traveling on a lane adjacent to a lane on which the host vehicle is traveling acquired by a side sensor provided in the host vehicle, wherein
determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and
determining whether the adjacent vehicle is overtaking the host vehicle based on the detection result of the adjacent vehicle acquired by the side sensor at the current time and the detection result of the adjacent vehicle acquired by the side sensor at a time before the current time and suppressing the blind area avoidance control while the adjacent vehicle is overtaking the host vehicle,
are performed,
  the method comprises determining that the host vehicle is overtaking the adjacent vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is less than or equal to a first threshold value continues for greater than or equal to a first determination time period,
  the detection result of the adjacent vehicle acquired by the side sensor at the current time and the detection result of the adjacent vehicle acquired by the side sensor at the time before the current time are detection results of the adjacent vehicle acquired by the side sensor at a timing when at least a part of the adjacent vehicle is positioned in a first determination area that is set at least at a front side of the host vehicle,
  the side sensor is arranged at the front center of the host vehicle,
  the distance between the front center of the host vehicle and a rear end of the first determination area is set to a value of 1 m to 5 m,
  a front end of the first determination area is set at a position where it is possible to get a time change of a relative position of a rear end of the adjacent vehicle with respect to the host vehicle for 0.5 second, the distance between the front end and the rear end of the first determination area is set to "A[m/s]×0.5[s]+margin[m]" where A [m/s] is a relative speed of the host vehicle with respect to the adjacent vehicle.

10. A non-transitory recording medium having recorded thereon a computer program for causing a processor to execute a process comprising:

acquiring surrounding vehicle information and surrounding road environment information of a host vehicle; and performing blind area avoidance control for making the host vehicle avoid traveling in a blind area of a surrounding vehicle based on the surrounding vehicle information, the surrounding vehicle information including a detection result of an adjacent vehicle traveling on a lane adjacent to a lane on which the host vehicle is traveling acquired by a side sensor provided in the host vehicle, wherein determining whether the host vehicle is overtaking the adjacent vehicle based on the detection result of the adjacent vehicle acquired by the side sensor at a current time and the detection result of the adjacent vehicle acquired by the side sensor at a time before the current time and suppressing the blind area avoidance control while the host vehicle is overtaking the adjacent vehicle, and determining whether the adjacent vehicle is overtaking the host vehicle based on the detection result of the adjacent vehicle acquired by the side sensor at the current time and the detection result of the adjacent vehicle acquired by the side sensor at a time before the current time and suppressing the blind area avoidance control while the adjacent vehicle is overtaking the host vehicle, are performed, the process comprises determining that the host vehicle is overtaking the adjacent vehicle based on the detection result of the adjacent vehicle acquired by the side sensor at the current time and the detection result of the adjacent vehicle acquired by the side sensor at the time before the current time when a state in which a value after subtracting the speed of the host vehicle from the speed of the adjacent vehicle is less than or equal to a first threshold value continues for greater than or equal to a first determination time period, the detection result of the adjacent vehicle acquired by the side sensor at the current time and the detection result of the adjacent vehicle acquired by the side sensor at the time before the current time are detection results of the adjacent vehicle acquired by the side sensor at a timing when at least a part of the adjacent vehicle is positioned in a first determination area that is set at least at a front side of the host vehicle, the side sensor is arranged at the front center of the host vehicle, the distance between the front center of the host vehicle and a rear end of the first determination area is set to a value of 1 m to 5 m, a front end of the first determination area is set at a position where it is possible to get a time change of a relative position of a rear end of the adjacent vehicle with respect to the host vehicle for 0.5 second, the distance between the front end and the rear end of the first determination area is set to "A[m/s]×0.5 [s]+ margin[m]" where A [m/s] is a relative speed of the host vehicle with respect to the adjacent vehicle.

* * * * *